United States Patent
Van Vliet et al.

(10) Patent No.: US 6,783,447 B2
(45) Date of Patent: Aug. 31, 2004

(54) FLOOR-TREATING MACHINE

(75) Inventors: Johannes Petrus Van Vliet, Alphen A/D Rijn (NL); Joop Henk Muller, Ter Aar (NL)

(73) Assignee: Holland Industriele, Diamantwerken B.V. (NL)

( * ) Notice: Subject to any disclaimer, the term of this patent is extended or adjusted under 35 U.S.C. 154(b) by 0 days.

(21) Appl. No.: 10/276,873

(22) PCT Filed: May 17, 2001

(86) PCT No.: PCT/NL01/00375

§ 371 (c)(1),
(2), (4) Date: Jun. 19, 2003

(87) PCT Pub. No.: WO01/87540

PCT Pub. Date: Nov. 22, 2001

(65) Prior Publication Data

US 2004/0023608 A1 Feb. 5, 2004

(30) Foreign Application Priority Data

May 17, 2000 (NL) .............................. 1015226

(51) Int. Cl.⁷ .............................................. B24B 17/08
(52) U.S. Cl. ....................................... 451/353; 451/359
(58) Field of Search ................................ 451/353, 350, 451/359

(56) References Cited

U.S. PATENT DOCUMENTS

| | | | | |
|---|---|---|---|---|
| 694,077 A | * | 2/1902 | Eisker ........................ | 451/353 |
| 835,631 A | * | 11/1906 | Sohenk ....................... | 451/353 |
| 866,074 A | * | 9/1907 | Mooney et al. ............. | 451/353 |
| 1,224,292 A | * | 5/1917 | Raasch et al. ............... | 15/52.2 |
| 1,919,389 A | * | 7/1933 | Myers ......................... | 451/353 |
| 1,988,193 A | * | 1/1935 | Eric ............................ | 451/353 |
| 3,398,490 A | * | 8/1968 | Redifer ....................... | 451/353 |
| 3,496,681 A | * | 2/1970 | Oswald ....................... | 451/353 |
| 4,097,950 A | * | 7/1978 | Satterfield ................... | 15/49.1 |
| 4,186,967 A | * | 2/1980 | Kuhmonen .................. | 299/25 |
| 4,319,434 A | * | 3/1982 | Brejcha ....................... | 451/353 |
| 4,709,510 A | * | 12/1987 | Giovanni et al. ........... | 451/353 |
| 5,377,375 A | * | 1/1995 | Holman et al. .............. | 15/49.1 |
| 5,637,032 A | * | 6/1997 | Thysell et al. .............. | 451/259 |
| 6,238,277 B1 | * | 5/2001 | Duncan et al. ............. | 451/271 |
| 6,494,772 B1 | * | 12/2002 | Barnes et al. ............... | 451/353 |
| 6,540,596 B1 | * | 4/2003 | Van Der Veen ............ | 451/350 |

FOREIGN PATENT DOCUMENTS

| | | |
|---|---|---|
| DE | 19729199 A | 7/1999 |
| DE | 197 29 199 A | 7/1999 |
| GB | 2 113 802 A | 8/1983 |
| GB | 2113802 A | 8/1983 |
| WO | WO 940875 A | 4/1994 |
| WO | WO 94 08752 A | 4/1994 |

* cited by examiner

*Primary Examiner*—M. Rachuba
(74) *Attorney, Agent, or Firm*—Webb Ziesenheim Logsdon Orkin & Hanson, P.C.

(57) ABSTRACT

Disclosed is a floor-treating machine having a frame with actuating means. A housing is attached to the frame such that it can rotate about a substantially vertical axis. At least three heads are mounted in the housing and each can rotate about a substantially vertical axis. The heads are provided on their bottom surface with treating means and/or coupling means for treating means to be coupled to. A shaft of the motor is concentric with respect to the vertical axis of the frame. The shaft is in driving interaction with the housing and the heads by means of respective transmissions. The transmission for driving the housing includes an auxiliary shaft that runs parallel to and at a distance from the axis of the frame. The auxiliary shaft is connected to the motor shaft via a first auxiliary transmission and to the housing via a second auxiliary transmission.

23 Claims, 2 Drawing Sheets

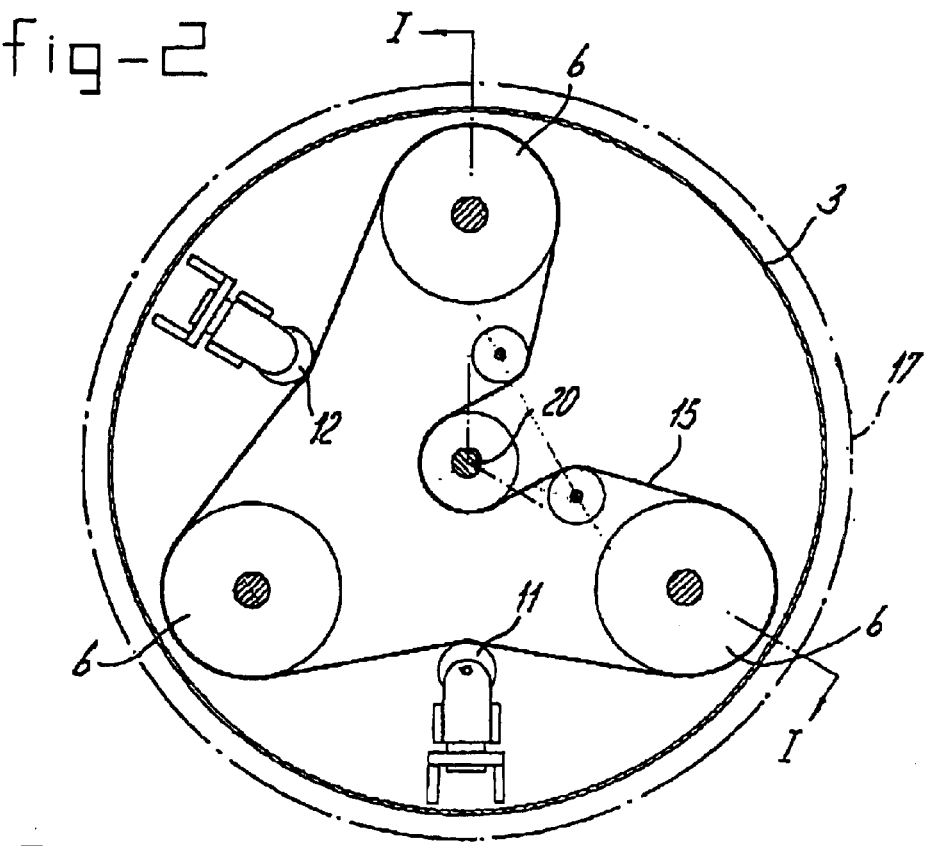
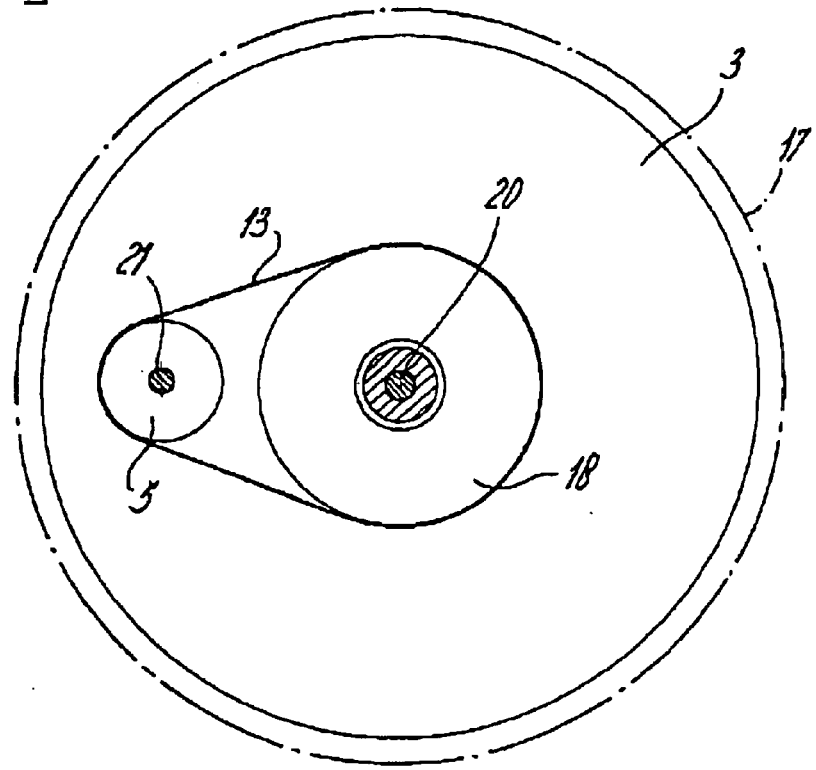

FLOOR-TREATING MACHINE

BACKGROUND OF THE INVENTION

1. Field of the Invention

The invention relates to a floor-treating machine, comprising a frame with actuating means, a housing, which is attached to the frame in such a manner that it can rotate about a substantially vertical axis and in which at least three heads, which can each rotate about a substantially vertical axis, are mounted, which heads are provided, on their bottom surface, with treating means and/or coupling means for treating means to be coupled to, a motor, the shaft of which is concentric with respect to the vertical axis of the frame, which shaft is in driving interaction with the housing and the heads by means of respective transmissions.

2. Brief Description of the Related Art

A floor-treating machine of this type is known from WO-A-9408752. This known floor-treating machine has the drawback that it is difficult to operate, on account of its relatively unstable behaviour. Moreover, it is difficult to set the speed reduction between the motor and the housing at the desired level.

A further drawback of the known floor-treating machine is that the two belt transmission used in this machine are situated inside the housing, making these belt transmissions relatively inaccessible. This is a drawback particularly with regard to the belt transmission which drives the housing. This belt transmission has a relatively high risk of breaking, particularly if the floor-treating machine is used on an uneven floor or a floor with projections and the like. However, replacing the belt for this transmission is rather time-consuming, in view of the difficulty of gaining access thereto.

SUMMARY OF THE INVENTION

It is an object of the invention to provide a floor-treating machine which avoids the drawback of being difficult to operate. This object is achieved by the fact that the transmission for driving the housing comprises an auxiliary shaft which runs parallel to and at a distance from the centre axis of the frame, which auxiliary shaft is connected, via a first auxiliary transmission, to the motor shaft and is connected, via a second auxiliary transmission, to the housing.

The central positioning of the motor result in a very stable floor-treating machine. Moreover, the two auxiliary transmissions ensure that the centrally positioned motor can drive the housing with the desired speed reduction.

According to the invention, an improvement can also be obtained in that the transmission, such as a belt transmission, for driving the housing is situated outside the said housing.

The belt transmission is quickly and easily accessible outside the housing. Consequently, the belt can be replaced without much time loss, so that the standstill time of the floor-treating machine is minimal.

Preferably, the shaft of the motor bears a driving pulley situated outside the housing, and a driven pulley is attached to the frame and is connected, in such a manner that it can be driven via a belt, to the driving pulley, which driven pulley is connected to the housing.

The driven pulley is connected to the housing via a speed reduction mechanism; if appropriate, it is possible to provide a speed reduction means which is connected to the housing via a further belt transmission. This further belt transmission has a belt which is stronger than the belt of the belt transmission situated outside the housing.

According to a preferred embodiment, the shaft of the motor is connected via a plug or claw coupling to a journal on the housing for driving the heads, and the belt transmission for driving the housing coincides with the shaft of the motor.

In connection with changing the belt, it is merely necessary to remove the motor, an operation which can be carried out relatively quickly and easily on account of the plug coupling. Then, the replacement belt can be fitted and the motor can be reinstalled.

BRIEF DESCRIPTION OF THE DRAWINGS

FIG. 2 shows the cross section on line II—II from FIG. 1.

FIG. 3 shows the cross section on line III—III from FIG. 1.

DETAILED DESCRIPTION OF THE PREFERRED EMBODIMENTS

Figure 1:
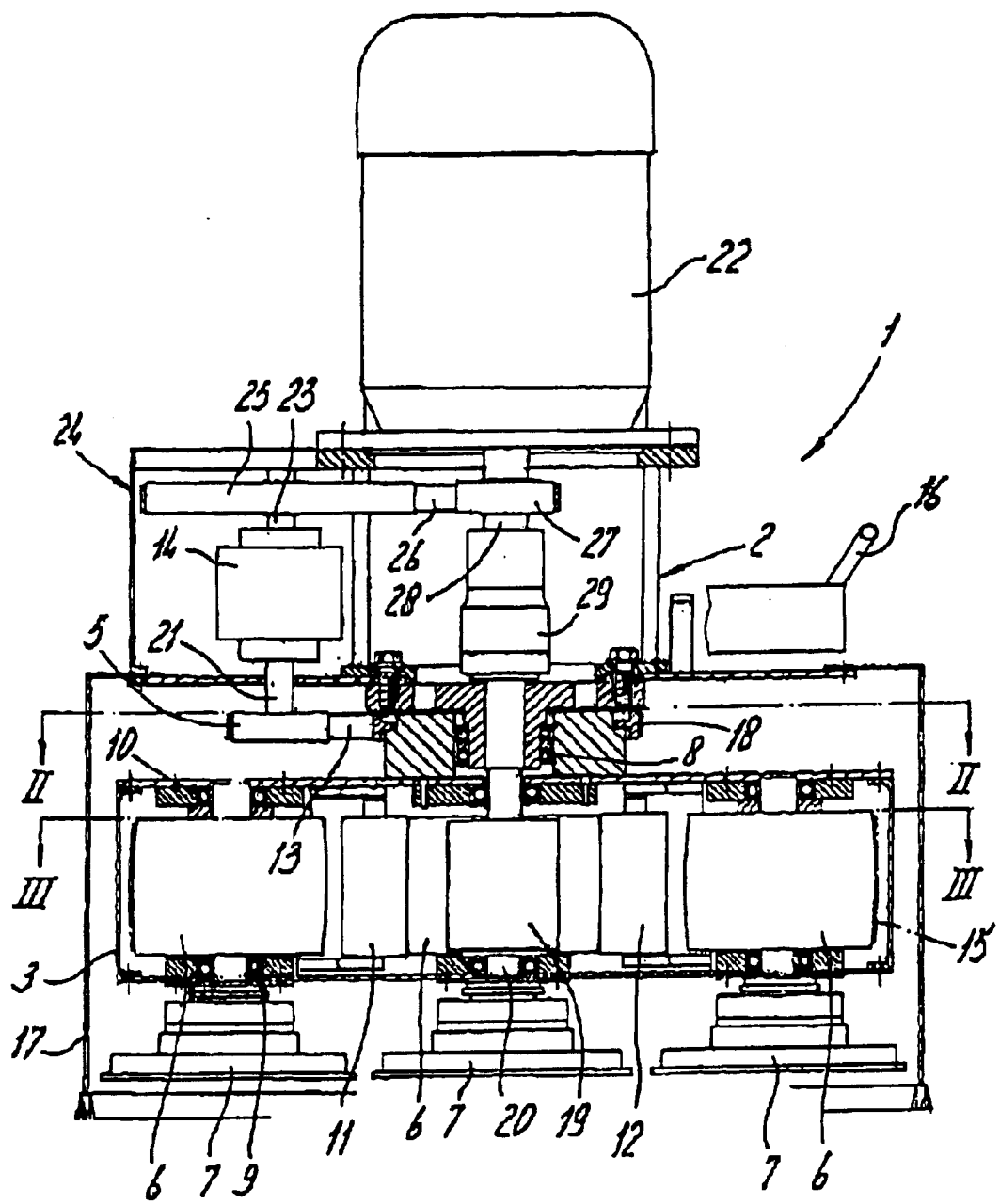
FIG. 1 shows a cross section through the device according to the invention on line I—I from FIG. 2.

The device 1 according to the invention which is illustrated in FIG. 1 has a frame 2, to which an actuating lever 16, which is only partially illustrated, is attached. The device can be advanced and steered over a surface to be treated by means of this lever 16. The frame 2 also bears a motor 22 which is connected to a drive roll 19 via a shaft 20.

The housing 3 is mounted rotatably on the frame by means of bearing 8. As well as the drive roll 19 which has already been mentioned, this housing accommodates three rolls 6 which each bear a head 7. An abrasive disk, by way of example, can be coupled to each head 7 by means of coupling means (not shown).

The rolls 6 are mounted in the housing 3 by means of bearings 9, 10. This housing 3 also bears a pulley 18 which is connected to the pulley 5 via the belt 13. This pulley 5 is attached to the shaft 21 which is connected, via speed reduction mechanism 14, to the auxiliary shaft 23. The belt 15 can be held at the desired tension by means of the tensioning rollers 11, 12.

Dust, waste, etc. which is produced during the abrasive movement can be collected by means of the apron 17 connected to the frame 2 and if appropriate can be extracted via means which are not shown.

The auxiliary shaft 23 is mounted rotatably, by means of a framework 24, on the frame 2 and bears a driven pulley 25, which is driven, via a belt 26, by the driving pulley 27 which is attached to the motor shaft 28.

The motor shaft 28 is coupled to the shaft 20 by means of the plug coupling 29. To replace the belt 26, which is preferably weaker than belt 13, it is merely necessary to remove the motor 22.

What is claimed is:

1. A floor-treating machine, comprising:
   a frame with actuating means and a substantially vertical axis;
   a housing attached to the frame in such a manner that it can rotate about the vertical axis of the frame;
   at least three heads mounted in the housing, each of the at least three heads is rotatable about a substantially vertical axis and has a bottom surface;
   treating means and/or coupling means for treating means to be coupled to provide on each bottom surface of each of the at least three heads; and
   a motor having a shaft concentric with respect to the vertical axis of the frame, the shaft is in driving interaction with the housing and the at least three heads by means of respective transmissions, wherein the transmission for driving the housing includes an auxiliary shaft running parallel to and at a distance from the vertical axis of the frame, the auxiliary shaft is connected via a first auxiliary transmission to the shaft of the motor and is connected via a second auxiliary transmission to the housing.

2. The floor-treating machine according to claim 1, wherein the first auxiliary transmission is situated outside the housing.

3. The floor-treating machine according to claim 1, wherein the first and second auxiliary transmissions are belt transmissions.

4. The floor-treating machine according to claim 2, wherein:

the shaft of the motor bears a driving pulley situated outside the housing; and a driven pulley is attached to the frame, is connected to the driving pulley in such a manner that the driven pulley can be driven via a belt, and is connected to the housing.

5. The floor-treating machine according to claim 4, wherein the driven pulley is connected to the housing via a speed reduction mechanism.

6. The floor-treating machine according to claim 5, wherein the speed reduction mechanism is connected to the housing via a further belt transmission.

7. The floor-treating machine according to claim 6, wherein:

the further belt transmission has a belt; and the belt of the further belt transmission is stronger than the belt of the belt transmission situated outside the housing.

8. The floor-treating machine according to claim 1, wherein:

the shaft of the motor is connected, via a plug or claw coupling, to a journal on the housing for driving the at least three heads; and the transmission for driving the housing coincides with the shaft of the motor.

9. The floor-treating machine according to claim 2, wherein the first and second auxiliary transmissions are belt transmissions.

10. The floor-treating machine according to claim 3, wherein:

the shaft of the motor bears a driving pulley situated outside the housing; and a driven pulley is attached to the frame, is connected to the driving pulley in such a manner that the driven pulley can be driven via a belt, and is connected to the housing.

11. The floor-treating machine according to claim 9, wherein:

the shaft of the motor bears a driving pulley situated outside the housing; and a driven pulley is attached to the frame, is connected to the driving pulley in such a manner that the driven pulley can be driven via a belt, and is connected to the housing.

12. The floor-treating machine according to claim 10, wherein the driven pulley is connected to the housing via a speed reduction mechanism.

13. The floor-treating machine according to claim 11, wherein the driven pulley is connected to the housing via a speed reduction mechanism.

14. The floor-treating machine according to claim 12, wherein the speed reduction mechanism is connected to the housing via a further belt transmission.

15. The floor-treating machine according to claim 13, wherein the speed reduction mechanism is connected to the housing via a further belt transmission.

16. The floor-treating machine according to claim 14, wherein:

the further belt transmission has a belt; and the belt of the further belt transmission is stronger than the belt of the belt transmission situated outside the housing.

17. The floor-treating machine according to claim 15, wherein:

the further belt transmission has a belt; and the belt of the further belt transmission is stronger than the belt of the belt transmission situated outside the housing.

18. The floor-treating machine according to claim 2, wherein:

the shaft of the motor is connected, via a plug or claw coupling, to a journal on the housing for driving the at least three heads; and the transmission for driving the housing coincides with the shaft of the motor.

19. The floor-treating machine according to claim 3, wherein:

the shaft of the motor is connected, via a plug or claw coupling, to a journal on the housing for driving the at least three heads; and the transmission for driving the housing coincides with the shaft of the motor.

20. The floor-treating machine according to claim 4, wherein:

the shaft of the motor is connected, via a plug or claw coupling, to a journal on the housing for driving the at least three heads; and the transmission for driving the housing coincides with the shaft of the motor.

21. The floor-treating machine according to claim 5, wherein:

the shaft of the motor is connected, via a plug or claw coupling, to a journal on the housing for driving the at least three beads; and the transmission for driving the housing coincides with the shaft of the motor.

22. The floor-treating machine according to claim 6, wherein:

the shaft of the motor is connected, via a plug or claw coupling, to a journal on the housing for driving the at least three heads; and the transmission for driving the housing coincides with the shaft of the motor.

23. The floor-treating machine according to claim 7, wherein:

the shaft of the motor is connected, via a plug or claw coupling, to a journal on the housing for driving the at least three heads; and the transmission for driving the housing coincides with the shaft of the motor.

* * * * *